METHOD OF PRODUCING TRANSISTORS

Filed June 10, 1959

INVENTOR

LOUIS MARIUS NIJLAND

BY

Frank R. Jeifari

AGENT 3,006,789

METHOD OF PRODUCING TRANSISTORS

Louis Marius Nijland, Eindhoven, Netherlands, assignor to North American Philips Company, Inc.

Filed June 10, 1959, Ser. No. 819,313
Claims priority, application Netherlands June 26, 1958
5 Claims. (Cl. 148—1.5)

The present invention relates to methods of making transistors, starting with a body consisting of semi-conductive material of a given conductivity type, which methods comprise the step in which by diffusion-treatment two super-imposed zones of different conductivity types are formed in this body, the outer zone, which is located at the surface, having the same conductivity type as the initial semi-conductive body.

In these known methods, two impurities, a donor and an acceptor, are diffused either successively or simultaneously into the surface of the semi-conductive member. The diffusion-coefficient of one of these impurities exceeds that of the other, but the solubility of this other impurity exceeds that of the first impurity.

An example is the diffusion of antimony and aluminum into a member consisting of n-type silicon. In this case the diffusion-treatment with antimony is carried out prior to, after or simultaneously with the diffusion-treatment with aluminum. As a result of the greater solubility of antimony with regard to that of aluminum the concentration of antimony immediately under the surface will grow to exceed the concentration of aluminum in the diffusion-treatment, so that a n-conductivity zone will form at the surface. As a result of the lower diffusion-coefficient of the antimony with regard to that of aluminum the concentration-gradient of the antimony to the inside will highly exceed the concentration-gradient of the aluminum. Accordingly, the concentration of the aluminum in a region lying more inwardly will grow to exceed the concentration of the antimony, so that a second zone of p-conductivity type will be formed beneath the n-conductivity zone.

In this manner a body has been made comprising in succession zones of n-, p- and n-conductivity type. For making a transistor these regions are required to be connected electrically. Hence, the regions must be provided with ohmic contacts. After removing the two zones, obtained by diffusion, over part of the surface an ohmic contact with the interior of the semi-conductive body can be provided at the free surface.

The zone at the surface can also be easily provided with an ohmic contact. However, a difficulty consists in establishing a satisfactory ohmic contact with the zone beneath to serve as a base-connection of the transistor.

It has been proposed to remove only the outer zone over part of the surface. Since, however, the zones obtained by diffusion are very thin it is difficult to keep the inner zone fully intact.

It has also been proposed to provide the inner zone with a base contact by fusing an alloy to the body. In this case an alloy which contains an impurity of the same conductivity type as that of the inner zone is fused, an ohmic contact with the inner zone and rectifying contacts with the zone at the surface and with the remainder of the semi-conductive body being obtained. Such an alloy contact has a limitation in that the rectifying contacts formed after the alloying process is found to have a low break-down voltage and often a high leakage current.

The present invention has inter alia for its object to make transistors by means of the aforesaid known diffusion method which permits an ohmic base-contact to be obtained in a simple manner.

In accordance with the invention, prior to carrying out the aforesaid known diffusion treatment, an impurity is diffused in, which produces a zone of a conductivity type opposite to that of the initial semi-conductive body, subsequently to which this zone is removed over part of the surface, this impurity having a greater solubility and at least the same diffusion coefficient as the impurity which of the two superimposed zones produces the outer zone situated at the surface.

In this manner a zone is formed which will not change its conductivity type even during the subsequent diffusion treatments. Although an impurity of opposite conductivity type is moreover diffused into the zone obtained according to the invention, its concentration in this zone will, as a result of its lower solubility, always be lower than the concentration of the impurity first diffused. Since also the diffusion constant of this impurity of opposite conductivity type is smaller than or equal to the diffusion constant of the impurity diffused in first, the impurity of opposite conductivity type will, as regards its concentration, not dominate the impurity diffused first even more inwardly.

After completing the diffusion process the zone obtained first together with the inner one of the two superimposed zones of different conductivity type will form an integral region of a conductivity type opposite to that of the interior of the semi-conductive body.

The zone formed first according to the invention and being at the surface may subsequently be provided with an ohmic contact, thus establishing in a simple manner a connection to the inner one of the two superimposed zones of different conductivity type, which acts as a base region.

In a preferred embodiment of the method according to the invention, after diffusing in the impurity constituting the inner one of the two superimposed zones, a part of the remaining zone formed first by diffusion is removed. After completing the diffusion treatment three ohmic contacts are provided, one at the free surface beneath the last removed part of the diffusion zone formed first, a second contact at the free surface of the outer one of the two superimposed zones obtained by diffusion, and a third contact at the free surface of the remainder of the zone formed by the first diffusion treatment.

In order to establish an ohmic contact with the interior of the semi-conductive body it is not necessary to remove a part of the two superimposed zones of different conductivity type, which might give rise to short-circuits due to undesired marginal effects and would increase the surface-recombination in the base region, thereby reducing the current amplification factor $\alpha$.

In order to improve the ohmic contact with the interior of the semi-conductive member, the last-mentioned method is preferably carried out in such manner that a region of increased conductivity will be formed where the contact with the interior of the semi-conductive body is established. For this purpose, after the first diffusion treatment and partial removal of the zone thus formed, the semi-conductive member is subjected to a diffusion treatment with the impurity constituting the inner of the two superimposed diffusion zones. Subsequently, a part of the remaining zone formed first is removed. Next, the body is subjected to a diffusion treatment for forming the outer zone located directly at the surface. During this treatment the impurity diffusing in forms at the surface, freed after removing the part of the remaining zone formed first, a zone of increased specific conductivity of the same type as that of the interior of the semi-conductive body.

The method according to the invention is particularly suitable for making silicon n-p-n-transistors, starting with a semi-conductive member of n-conductivity type silicon. The impurity used for the first diffusion-treatment is boron, while aluminum and antimony are used for the impurities forming the two superimposed zones. The values of the diffusion coefficients and the solubilities of these impurities in silicon are particularly suitable for carrying out the method according to the invention with the use of the last-mentioned materials.

In the table below, the order of the aforesaid values is given at a temperature of 1200° C.

| Element diffusing into Si | Solubility in cm.$^{-3}$ | Diffusion-coefficient in cm.$^{2}$ sec.$^{-1}$ |
|---|---|---|
| B | $10^{21}$ | $10^{-11}$ |
| Al | $10^{18}$ | $10^{-11}$ |
| Sb | $10^{19}$ | $10^{-13}$ |

From this table it is seen that the solubility of boron is approximately 100 times and its diffusion coefficient is approximately 100 times higher than those of antimony, whence it follows that in the case of a diffusion treatment with antimony, the influence of antimony on a zone formed by diffusion of boron will only be small.

In order that the invention may be readily carried into effect, examples will now be described in detail with reference to the accompanying drawing.

In the figures, corresponding parts are denoted by the same reference numerals.

The figures are vertical sectional views of semi-conductive bodies after several processing stages with the use of the method according to the invention.

*Example 1*

Figure 1A:
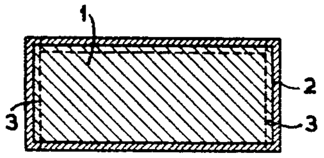
FIGURES 1A to 1D represent several stages of the manufacture of a transistor by the method according to the invention.

A wafer consisting of n-silicon having a specific resistance of 1 ohm, is heated in an atmosphere containing boron chloride for half an hour at 800° C., a boron deposit being formed on the entire surface of the wafer. Subsequently the wafer is heated in an atmosphere of pure nitrogen for three hours at 1200° C. The boron formed by decomposition of boron chloride diffuses into the wafer. The result is shown in FIG. 1A. By diffusion in of boron a thin, p-conductivity zone 2 with a thickness of about 10$\mu$ has been formed around an unchanged region 1 of the initial tablet.

Figure 1B:
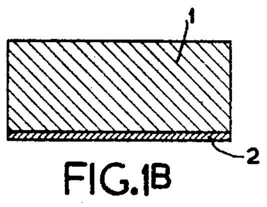

The side layers and top layer of the tablet are removed to the broken lines 3, thus obtaining a wafer as shown in FIG. 1B. The zone 2 obtained by the diffusion of boron has been removed but for the bottom side and the initial semi-conductive region 1 again has free surface parts.

Figure 1C:
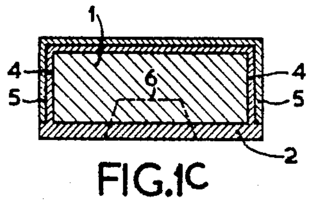

Subsequently aluminum and antimony are diffused in simultaneously. This diffusion step is carried out in a closed vacuum tube, in which some aluminum and antimony is present, by heating this tube for two hours at 1200° C. The resulting semi-conductive body is shown in FIG. 1C. Inside the semi-conductive body a region 1 of n-silicon remains unchanged. During the second diffusion treatment the boron penetrates deeper into the semi-conductive body so that the thickness of the zone 2 has been increased to about 13$\mu$. In this zone 2, a quantity of aluminum and antimony is dissolved but their concentrations are small with regard to that of boron. Beneath the top and the side faces, however, two zones of opposite conductivity type have been formed by diffusion in of aluminum and antimony, the deeper zone 4 with a thickness of about 3$\mu$ containing the more rapidly diffusing aluminum in excess so that it is p-conductive, while the zone 5 at the surface, with a thickness of about 3$\mu$, contains the more soluble antimony in excess and is consequently n-conductive. The p-conductivity zone 4 adjoins and is integral with p-conductivity zone 2, thus obtaining a p-conductive region. The n-conductivity zone 5 is separated from the unchanged n-conductivity region 1 by the p-conductivity zone 4.

Figure 1D:
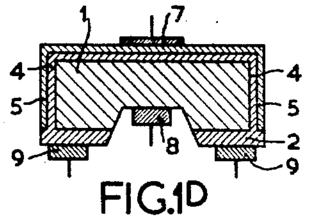

For the further manufacture of the transistor, a part of the semi-conductive member is removed to the broken line 6, subsequently to which the ohmic contacts are provided by conventional soldering techniques. The transistor thus obtained is shown in FIGURE 1D. An emitter contact 7 is provided on top of the zone 5. At the free surface of the initially n-conductivity region 1 provision is made of a collector contact 8, while an annular base-contact 9 is provided on the zone 2 formed by diffusion of boron.

*Example 2*

A silicon body as shown in FIG. 1B is made in the manner set out in Example 1. This body comprises a region of n-conductivity type 1 and a lower p-conductivity zone 2 formed by diffusion of boron.

Figure 2A:
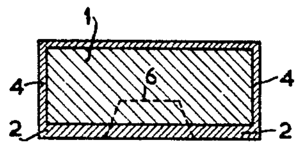
FIGURES 2A to 2D represent stages of the manufacture of a different transistor with the use of a variant of the method according to the invention.

Subsequently, aluminum is diffused in. The body thus obtained is shown in FIG. 2A. Besides the zone 2, a p-conductivity zone 4 obtained by diffusing in aluminum is formed at the top and at the sides.

Figure 2B:
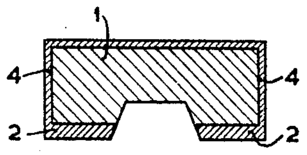

A part of the semi-conductive body is removed to the broken line 6, the body then having the shape shown in FIG. 2B.

Figure 2C:
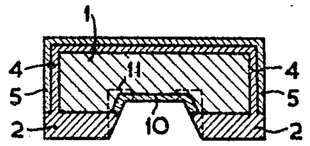

Subsequently, antimony is diffused in. The state after this diffusion is shown in FIG. 2C. During this diffusion both boron and aluminium penetrate deeper into the body. The slowly diffusing antimony is unable locally to dominate the boron in the zone 2 in respect of concentration. Immediately under the surface of the top and the sides, the antimony forms a n-conductivity zone 5 since as a result of its better solubility, it will in situ predominate over the aluminum in respect to concentration. Due to the lower diffusion rate of the antimony relative to the aluminum, the antimony is unable to dominate the aluminium as regards concentration deeper in the semi-conductive material, so that beneath the zones 5 there is a zone 4 of opposite conductivity type. The zone 4 together with the zone 2 constitutes a region of p-conductivity type, similarly as in the transistor made according to the preceding example.

Figure 2D:
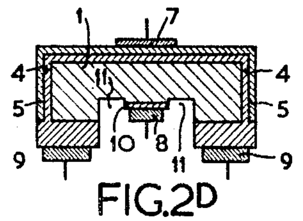

In this case an n-conductivity zone 10 has also formed at the lower side of the semi-conductive member at the surface where there is no longer a zone formed by boron. The zone directly adjoins the unchanged part 1 of the semi-conductive body. Both the part 1 and the zone 10 have n-conductivity, but as a result of the antimony diffused in the zone 10 has a specific resistance much lower than that of the part 1. After providing ohmic contacts 7, 8 and 9 a transistor as shown in FIG. 2D is obtained, the collector contact 8 of which has a low contact resistance with the region 1 as a result of its contact with the conductive zone 10.

The barrier layer between the conductive zones 2 and 10 has a comparatively low break-down voltage. Therefore, this barrier preferably may be removed by forming a groove 11.

The preceding examples relate to the manufacture of a transistor, starting with a semi-conductive body consisting of silicon of n-conductivity type. Alternatively, bodies of other semi-conductive materials may be used. The impurities to be diffused in should then be donors and acceptors, the solubility and diffusion coefficients of which have suitable values. Thus, in a body consisting of germanium of p-conductivity type, arsenic may first be diffused, subsequently to which the resulting n-conductivity zone may be removed over part of the surface and finally antimony and indium may be diffused in to obtain a p-n-p-transistor, while a base-connection may be provided on the n-conductivity zone obtained by diffusion of arsenic.

As regards the choice of the two impurities of opposite conductivity type, which are to form the superimposed zones of different conductivity type, it is known that one impurity should have a greater solubility and a lower diffusion coefficient than the other impurity. According to the invention the choice of the impurity diffused in first of all is determined by a greater solubility and the same or a higher diffusion coefficient than those of the impurity forming the outer of the two superimposed zones.

The term "type" of an impurity is to be understood to mean "donor" or "acceptor." The term "conductivity type" is to be understood to mean "n-" or "p-conductivity type."

The terms "solubility" and "diffusion-coefficient" of an impurity used in the specification and in the claims are to be understood to relate to diffusion in the semiconductive material of the body, of which the transistor is made, and at a conventional diffusion temperature.

What is claimed is:

1. In the method of making a diffused transistor on a body of semiconductive material of one conductivity type, wherein first and second opposite-conductivity-type-forming impurities are diffused into the body from its surface, said first impurity having a greater solubility in the semiconductive material and a smaller diffusion coefficient than that of the second impurity, whereby there is formed within the body an inner zone of the opposite conductivity type determined by the second impurity and forming a junction with the body interior, and an outer surface zone of the said one conductivity type determined by the first impurity and forming a junction with the inner zone, the improvement comprising, before diffusing in the first and second impurities, first diffusing into the body a third impurity having a greater solubility than that of the first and second impurities and a diffusion coefficient at least equal to that of the first impurity and of the opposite conductivity-forming-type as the latter to form a surface zone within the body of the said opposite conductivity type and of higher conductivity and thereafter removing part of the said high conductivity surface zone thereby exposing the body interior after which the first and second impurities are diffused into the body, and contacting the high conductivity surface zone remaining to effect an ohmic connection to the said inner zone.

2. A method as claimed in claim 1 wherein the body is of n-type silicon, the first impurity is antimony, the second impurity is aluminum, and the third impurity is boron.

3. A method of making a diffused transistor on a body of semiconductive material of one conductivity type, comprising diffusing into the body a first impurity of the opposite conductivity-forming-type as that of the body to form a surface zone within the body of the opposite conductivity type and of high conductivity, thereafter removing part of the said high conductivity surface zone thereby exposing the body interior, thereafter diffusing into the body from its surface second and third opposite-conductivity-type-forming impurities, said second impurity having a greater solubility in the semiconductive material and a smaller diffusion coefficient than that of the third impurity, whereby there is formed within the body an inner zone of the opposite conductivity type determined by the third impurity and integral with the said high conductivity surface zone and forming a junction with the body interior, and an outer surface zone of the said one conductivity type determined by the second impurity and forming a junction with the inner zone, said first impurity having a greater solubility than that of the second and third impurities and a diffusion coefficient at least equal to that of the second impurity, thereafter removing a portion of the body to expose the body interior of the said one conductivity type, thereafter contacting the high conductivity surface zone remaining to effect an ohmic connection to the said inner zone, contacting the outer surface zone, and contacting the exposed body interior.

4. A method of making a diffused transistor on a body of semiconductive material of one conductivity type, comprising diffusing into the body a first impurity of the opposite conductivity-forming-type as that of the body to form a surface zone within the body of the opposite conductivity type and of high conductivity, thereafter removing part of the said high conductivity surface zone thereby exposing the body interior, thereafter diffusing into the body from its surface a second impurity of the opposite conductivity-forming type, thereafter removing a portion of the body to expose again the body interior of the said one conductivity type, thereafter diffusing into the body a third impurity of the one conductivity-forming type, said third impurity having a greater solubility in the semiconductive material and a smaller diffusion coefficient than that of the second impurity, whereby there is formed within the body an inner zone of the opposite conductivity type determined by the second impurity and integral with the said high conductivity surface zone and forming a junction with the body interior, and an outer surface zone of the said one conductivity type determined by the third impurity and forming a junction with the inner zone and also a surface zone of said one conductivity type at the exposed body interior, said first impurity having a greater solubility than that of the second and third impurities and a diffusion coefficient at least equal to that of the third impurity, removing portions of the body to isolate the said surface zone at the exposed body interior, thereafter contacting the high conductivity surface zone remaining to effect an ohmic connection to the said inner zone, contacting the outer surface zone, and contacting the isolated surface zone to effect an ohmic connection to the body interior.

5. A method as set forth in claim 4 wherein the second removal step is carried out at the high conductivity surface zone.

References Cited in the file of this patent

UNITED STATES PATENTS

| | | |
|---|---|---|
| 2,823,148 | Pankove | Feb. 11, 1958 |
| 2,836,521 | Longini | May 27, 1958 |
| 2,841,510 | Mayer | July 1, 1958 |
| 2,861,229 | Pankove | Nov. 18, 1958 |
| 2,898,247 | Hunter | Aug. 4, 1959 |
| 2,909,453 | Losco et al. | Oct. 20, 1959 |
| 2,910,634 | Rutz | Oct. 27, 1959 |